B. F. MORLEDGE.
MILK BOTTLE STOPPER.
APPLICATION FILED JUNE 19, 1919.
1,372,715.
Patented Mar. 29, 1921.
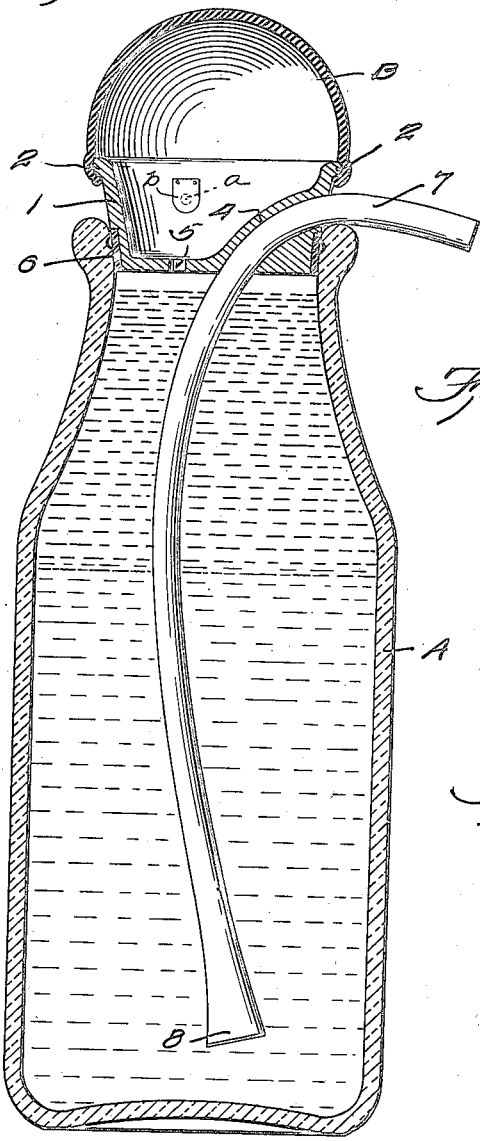
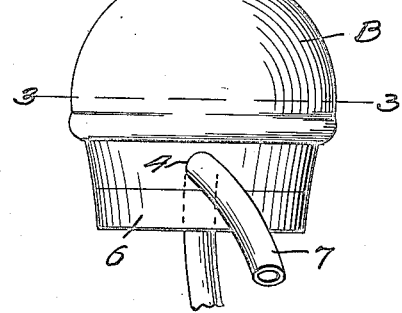
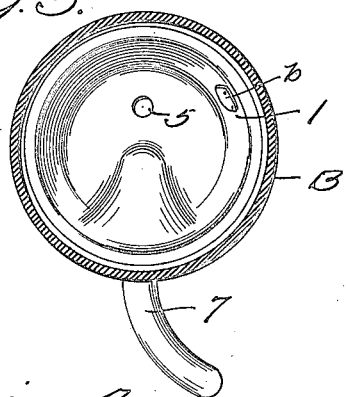
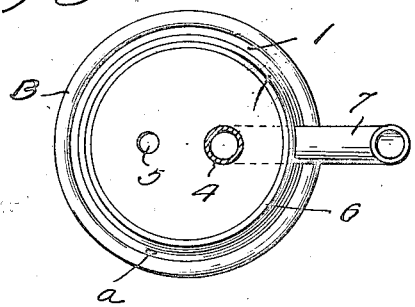
Witness
Inventor
B. F. Morledge
By
Attorney

UNITED STATES PATENT OFFICE.

BERT F. MORLEDGE, OF COLUMBUS, INDIANA.

MILK-BOTTLE STOPPER.

1,372,715.

Specification of Letters Patent.   Patented Mar. 29, 1921.

Application filed June 19, 1919.   Serial No. 305,296.

*To all whom it may concern:*

Be it known that I, BERT F. MORLEDGE, a citizen of the United States, residing at Columbus, in the county of Bartholomew and State of Indiana, have invented certain new and useful Improvements in Milk-Bottle Stoppers, of which the following is a specification.

This invention relates to certain new and useful improvements in milk bottle stoppers.

The primary object of my invention is to provide a stopper for milk bottles, so constructed that the milk can be readily separated from the cream the stopper being of a simple construction and readily adjusted in position, in a manner insuring the milk being separated from the cream with ease, accuracy and despatch.

With these and other ends in view which will readily appear as the nature of the invention is better understood, the same consists in the improved construction and novel arrangement and combination of parts which will be hereinafter fully described and particularly pointed out in the claim.

In the accompanying drawing has been illustrated a simple and preferred form of the invention, it being, however, understood that no limitation is necessarily made to the precise structural details therein exhibited, but that changes, alterations and modifications within the scope of the claim may be resorted to when desired.

In the drawing:—

Figure 1 is a central sectional view of a milk bottle showing my stopper in position.

Fig. 2 is a side view of my stopper.

Fig. 3 is a section on lines 3—3 of Fig. 2.

Fig. 4 is a bottom view of the stopper.

In the accompanying drawings I show at A, an ordinary milk bottle or container such as are now universally used by milk vendors.

Closing the bottle is the dished stopper 1, having the circular circumscribing flange 2, the tube opening 4 and escape way 5. Surrounding the wall of the stopper is the pliable preferably rubber ring 6, insuring an air tight union of the stopper and bottle.

Adjustably held in the opening 4 is the rubber tube 7 the lower end 8 of which is flared as shown. The upper end of the tube extends through the wall of the stopper while the lower end extends through the bottom as shown.

Surrounding the upper edge of the stopper is the bulb B, in the form of a half sphere, the edge of which is drawn over the flange 2, in the manner shown in Fig. 1. In order to permit the entry of air necessary when the bulb is operating, I provide the vent opening *a* covered by means of the flexible valve plate *b*.

In Fig. 1, I show the stopper in working position in connection with a milk bottle. The operation of the device is very simple. When it is desired to remove the milk from the cream the lower end of the tube is so positioned that it comes a suitable distance above the bottom of the bottle, or container when the bulb is compressed to force the air into the bottle, resulting in the milk being forced out finally leaving the cream in the bottle.

From the foregoing description taken in connection with the drawings, the construction and operation of the invention will be readily understood without requiring a more extended explanation.

Various changes in the form, proportion and the minor details of construction may be resorted to without departing from the principle or sacrificing any of the advantages of the invention as claimed.

Having thus described my said invention, what I claim as new and desire to secure by United States Letters Patent is:

A milk bottle stopper comprising a cup shaped obturator adapted on its lower periphery to fit the top of a milk bottle and beaded on its upper periphery, a semi-spherical bulb member adapted to fit over the bead, a tube passing through the cup adapted to extend into the bottle, and means whereby air may be passed through the cup into the bottle.

In testimony whereof I affix my signature.

BERT F. MORLEDGE.